United States Patent
Wang et al.

(10) Patent No.: US 9,219,698 B2
(45) Date of Patent: Dec. 22, 2015

(54) PROVIDING A LAYER-3 INTERFACE

(75) Inventors: Minghui Wang, Beijing (CN); Jie Li, Beijing (CN); Yi Huang, Beijing (CN)

(73) Assignee: HANGZHOU H3C TECHNOLOGIES CO., LTD., Zhejiang (CN)

( * ) Notice: Subject to any disclaimer, the term of this patent is extended or adjusted under 35 U.S.C. 154(b) by 115 days.

(21) Appl. No.: 14/007,532

(22) PCT Filed: May 18, 2012

(86) PCT No.: PCT/CN2012/075728
§ 371 (c)(1),
(2), (4) Date: Sep. 25, 2013

(87) PCT Pub. No.: WO2012/159553
PCT Pub. Date: Nov. 29, 2012

(65) Prior Publication Data
US 2014/0064272 A1    Mar. 6, 2014

(30) Foreign Application Priority Data

May 25, 2011  (CN) .......................... 2011 1 0137437

(51) Int. Cl.
| | |
|---|---|
| H04L 12/935 | (2013.01) |
| H04L 12/931 | (2013.01) |
| H04L 12/46 | (2006.01) |
| H04L 29/12 | (2006.01) |

(52) U.S. Cl.
CPC .......... *H04L 49/354* (2013.01); *H04L 12/4679* (2013.01); *H04L 61/2038* (2013.01); *H04L 61/6022* (2013.01)

(58) Field of Classification Search
None
See application file for complete search history.

(56) References Cited

U.S. PATENT DOCUMENTS

| | | | |
|---|---|---|---|
| 7,860,092 B2 | 12/2010 | Yoon et al. | |
| 7,944,918 B2 | 5/2011 | Cabeca et al. | |
| 2004/0252722 A1* | 12/2004 | Wybenga et al. | 370/474 |

FOREIGN PATENT DOCUMENTS

| | | |
|---|---|---|
| CN | 101127681 | 2/2008 |
| CN | 101494610 | 7/2009 |

(Continued)

OTHER PUBLICATIONS

Common|Define Common at Dictionary.com, pp. 1 [online], [retrieved on Aug. 27, 2015]. Retrieved from the Internet <URL: http://dictionary.reference.com/browse/common>.*
CN First Office Action dated Apr. 7, 2013 issued on CN Patent Application No. 201110137437.6 dated May 25, 2011, The State Intellectual Property Office, P.R. China.

(Continued)

*Primary Examiner* — Omar Ghowrwal
(74) *Attorney, Agent, or Firm* — Mannava & Kang, P.C.

(57) ABSTRACT

Providing a VLAN virtual interface of a default VLAN as a VLAN virtual interface of a layer-3 Ethernet interface provided on an apparatus, assigning an interface MAC address for the layer-3 Ethernet interface, setting a layer-3 interface entry including at least the interface MAC address of the layer-3 Ethernet interface and a VLAN ID of the default VLAN, providing a VLAN virtual interface of a layer-3 Ethernet sub-interface provided on the apparatus based on a binding VLAN of the layer-3 Ethernet sub-interface, assigning an interface MAC address to the layer-3 Ethernet sub-interface, setting a layer-3 sub-interface entry including at least the interface MAC address of the layer-3 Ethernet sub-interface and a VLAN ID of the binding VLAN, receiving a packet from one interface of the apparatus, and performing layer-3 forwarding for the packet if the layer-3 interface entry or the layer-3 interface entry matching with a destination MAC address and a VLAN ID of the packet.

20 Claims, 2 Drawing Sheets

(56) References Cited

FOREIGN PATENT DOCUMENTS

| CN | 102035740 | 4/2011 |
|----|-----------|--------|
| CN | 102158421 | 8/2011 |
| KR | 10-0694296 | 3/2007 |

OTHER PUBLICATIONS

International Search Report and Written Opinion dated Sep. 13, 2012 issued on PCT Patent Application No. PCT/CN2012/075728, The State Intellectual Property Office, the P.R. China.

* cited by examiner

PROVIDING A LAYER-3 INTERFACE

CLAIM FOR PRIORITY

The present application is a national stage filing under 35 U.S.C 371 of PCT application number PCT/CN2012/075728, having an international filing date of May 18, 2012, which claims priority to Chinese Patent Application No. 201110137437.6, filed on May 25, 2011, the disclosures of which are hereby incorporated by reference in their entireties.

BACKGROUND

Generally, Ethernet interfaces provided by a switch include layer-2 Ethernet ports. The layer-2 Ethernet port is one of the physical interfaces on the switch, works in a data link layer, processes layer-2 protocols, and implements layer-2 transmission. In addition, layer-3 Ethernet interfaces are also one of the interfaces on the switch, works in a network layer, configures Internet Protocol (IP) address, processes layer-3 protocols, and provides route functions.

When a switch processes packets received from the Ethernet interfaces at different layers, some Ethernet interfaces may work in a bridging mode or in a routing mode, and these kinds of Ethernet interfaces are called layer-2/layer-3 switchable Ethernet interfaces. When the Ethernet interface is configured in the bridging mode, packets are transmitted through hardware of the switch, and the Ethernet interface cannot configure IP addresses. When the Ethernet interface is configured in the routing mode, packets are transmitted according to layer-3 IP route.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
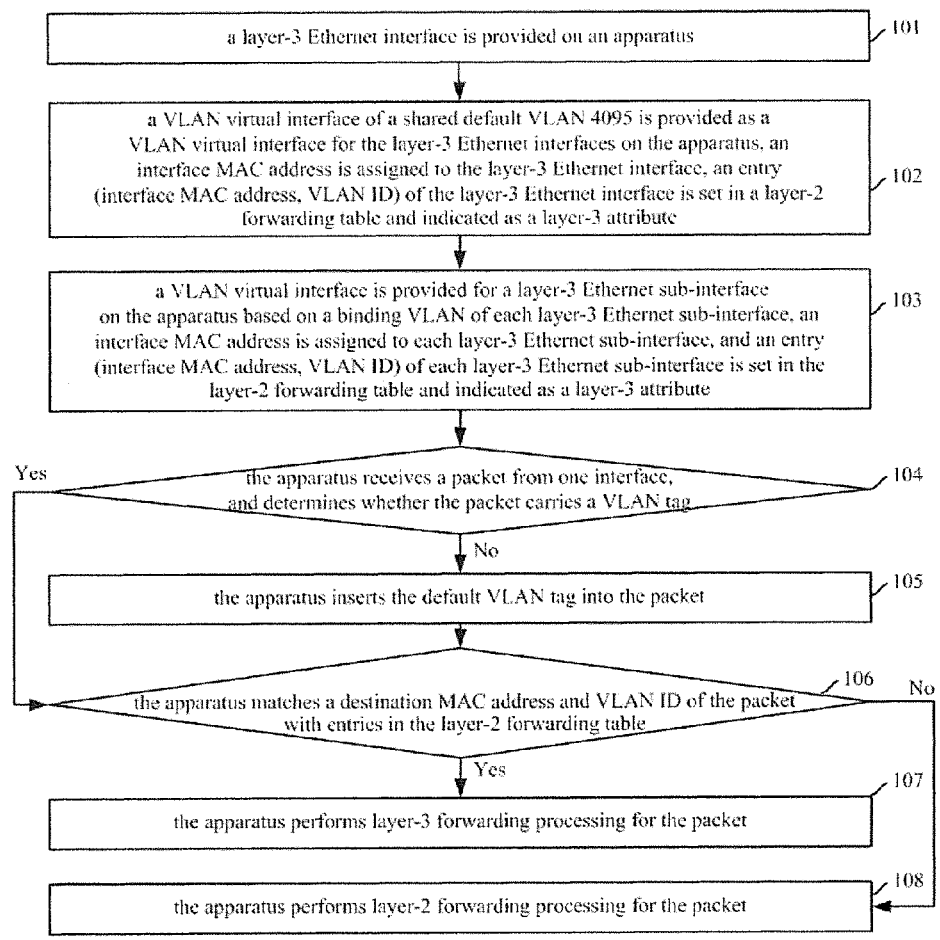
FIG. 1 is a flowchart illustrating a method for providing a layer-3 interface, according to an example of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on. In addition, the terms "a" and "an" are intended to denote at least one of a particular element.

The hardware of a switch usually supports layer-3 interface configurations of a Virtual Local Area Network (VLAN) virtual interface mode, and thus the mode commonly used for implementing a layer-3 Ethernet interface tries to assign a specific VLAN virtual interface for the Ethernet interface. Because VLAN is part of global resources for the switch, a mode of reserving VLAN is usually used. That is, when a layer-3 Ethernet interface is configured, a reserved VLAN is specially assigned for the layer-3 Ethernet interface, and a virtual interface corresponding to the VLAN is configured. The reserved VLAN cannot be used by any other users.

Layer-3 Ethernet sub-interface is one of the logic interfaces on the switch, works in the network layer, configures IP addresses, and processes layer-3 protocols. By using the layer-3 Ethernet sub-interface, the problem that layer-3 Ethernet interface cannot identify VLAN packets is solved. The user may configure multiple layer-3 Ethernet sub-interfaces for one layer-3 Ethernet interface, in this way, the packets from different VLANs can be transmitted through different layer-3 Ethernet sub-interfaces, which provides high flexibility for the user.

Usually, some low-end switches only support layer-3 Ethernet interface, while middle-end/high-end switches support the layer-3 Ethernet sub-interface. The layer-3 Ethernet sub-interface of the middle-end/high-end switch is also implemented by using the mode of reserving VLAN. When a new sub-interface is provided on the layer-3 Ethernet interface, a VLAN is reserved for the sub-interface, and a virtual interface of the VLAN is provided to implement the layer-3 Ethernet sub-interface. All of the packets received from the layer-3 Ethernet sub-interface carry a VLAN tag, and the VLAN tag needs to be changed to a reserved VLAN tag of the layer-3 Ethernet sub-interface on the layer-3 Ethernet interface.

The advantages of transforming the layer-3 Ethernet interface/sub-interface into the virtual interface by using the mode of reserving VLAN are as follows:

Firstly, the solution is simple and has low risk. After the layer-3 Ethernet interface/sub-interface is transformed into the virtual interface by using the mode of reserving VLAN, subsequent processes are the same as the basic processing of the switch.

In addition, the layer-3 Ethernet interface/sub-interface only processes packets needing implementation of layer-3 transmission, and thus should be isolated from any layer-2 Ethernet interfaces. By using the mode of reserving VLAN, each packet that comes in at the layer-3 Ethernet interface/sub-interface is mapped to the reserved VLAN. Each reserved VLAN is assigned for one layer-3 Ethernet interface or one layer-3 Ethernet sub-interface. The reserved VLANs are different from each other and cannot be used by the user and have natural layer-2 isolation characteristics. Thus, the layer-2 isolation is not needed for the layer-3 Ethernet interface/sub-interface.

The disadvantages of having the layer-3 Ethernet interface/sub-interface as the virtual interface by using the mode of reserving VLAN are as follows:

Firstly, configurations of the user are limited. After one VLAN is reserved, the user cannot use this reserved VLAN again. For example, a layer-3 Ethernet sub-interface is usually bound to a specific VLAN. The value range of the VLAN is VLAN 1~4094, and when a VLAN is reserved, the user can not bind the reserved VLAN with the layer-3 Ethernet sub-interface.

In addition, for some switches, the binding VLAN of the layer-3 Ethernet sub-interface could only be selected from VLANs in the range of VLAN 1~VLAN1024 which are used for user configuration, and thus the reserved VLAN could be selected from VLANs in the range of VLAN 1025~VLAN 4094 which are reserved for the system. But in this way, the configurations for the user configurations are greatly limited.

Examples will be described in detail with respect to the accompanying figures.

FIG. 1 is a flowchart illustrating a method for providing a layer-3 interface in accordance with an example. As shown in FIG. 1, the method includes the following operations.

Block 101, a layer-3 Ethernet interface is provided on an apparatus, and each chip on which one layer-3 Ethernet interface is provided may be configured as follows: layer-2 packets received from a physical port corresponding to the layer-3 Ethernet interface are forbidden from being transmitted to all of the external ports of the same chip and layer-2 packets received from the other physical ports of the same chip are forbidden from being transmitted to the physical port corresponding to the provided layer-3 Ethernet interface. In addition, a chip that is not the chip on which the provided layer-3 Ethernet interface is located may be configured as follows: layer-2 packets received from the physical port corresponding to the provided layer-3 Ethernet interface are forbidden from being transmitted to all external ports of the chip.

For example, when a layer-3 Ethernet interface m is provided, a chip C on which the layer-3 Ethernet interface M is located may be configured as follows: layer-2 packets received from physical port M' corresponding to the layer-3 Ethernet interface M are forbidden from being transmitted to all of the external ports on the chip C on which the layer-3 Ethernet interface M is located, and layer-2 packets received from any of the other ports on the same chip are forbidden from being transmitted to the physical port M' corresponding to the layer-3 Ethernet interface M. In addition, the chip that is not the chip on which the layer-3 Ethernet interface m is located, such as a chip on which a layer-3 Ethernet interface n is located may be configured as follows: layer-2 packets coming from the physical port corresponding to the layer-3 Ethernet interface m are forbidden from being transmitted to all of the external ports of the chip on which the layer-3 Ethernet interface n is located.

The external ports of the chip refer to ports used by the chip to interact with other apparatus, including layer-2 ports and layer-3 Ethernet interfaces, and do not include ports for connecting chips and a Central Processing Unit (CPU) in the apparatus.

In order to normally transmit the layer-2 protocol packets, the layer-3 Ethernet interface also needs to support some layer-2 protocol configurations, for example, all of the chips having layer-3 Ethernet interface are configured such that layer-2 protocol packets sent by the CPU are allowed to be sent to the external ports on the same chip.

In practical applications, multiple layer-3 Ethernet interfaces may be bounded together to form a layer-3 aggregation port, in which the layer-3 aggregation port has one aggregation ID, and each of the chips on the apparatus are configured such that layer-2 packets having the aggregation ID are forbidden from being transmitted to all of the external ports of the chip.

Block 102, a VLAN virtual interface of a shared default VLAN 4095 is provided as a VLAN virtual interface for the layer-3 Ethernet interfaces on the apparatus, an interface MAC address is assigned to the layer-3 Ethernet interface, an entry (interface MAC address, VLAN ID) of the layer-3 Ethernet interface is set in a layer-2 forwarding table and indicated as a layer-3 attribute. Hereinafter, entry of each layer-3 Ethernet interface is called a layer-3 interface entry. In each layer-3 Ethernet interface entry, the VLAN ID is VLAN 4095, and the interface MAC address is the MAC address assigned to each layer-3 Ethernet interface.

In the examples of the present disclosure, the apparatus may be a switch.

The shared default VLAN for all of the layer-3 Ethernet interfaces may be VLAN 0 as well. The binding VLAN of the layer-3 Ethernet sub-interface may be selected from the range of VLAN 1~VLAN 4094, and the reserved VLAN may be selected from the range of VLAN 0~VLAN 4095. Thus, the shared default VLAN for all layer-3 Ethernet interfaces may be selected as VLAN0 or VLAN4095, in order to not influence VLAN used for user configuration.

Packets received by the layer-3 Ethernet interface are untagged packets, i.e., the packets do not have a VLAN tag/VLAN ID. For instance, if the default VLAN for each physical port corresponding to each layer-3 Ethernet interface is configured as VLAN 4095, each physical port corresponding to each layer-3 Ethernet interface inserts VLAN ID 4095 into the untagged packets, so that the untagged packets received from the layer-3 Ethernet interface are mapped to the VLAN 4095. In this way, the layer-3 forwarding function of the layer-3 Ethernet interface is implemented by configuring the virtual interface of VLAN 4095, i.e., VLAN 4095 virtual interface, on the layer-3 Ethernet interface.

It should be noted that, all of the layer-3 Ethernet interfaces may share the same VLAN virtual interface, which may be the VLAN 4095 Virtual interface or the VLAN 0 Virtual interface.

Due to multiple layer-3 Ethernet interfaces may have the same VLAN virtual interface, the following processing is provided to avoid repeatedly setting and deleting the VLAN virtual interface.

One counter having counting value 1 is configured for the VLAN ID of the VLAN virtual interface of the layer-3 Ethernet interface, i.e., the VLAN ID of the default VLAN. In response to the VLAN virtual interface of the default VLAN is provided as a VLAN virtual interface of another layer-3 Ethernet interface, a counting value 1 is added to the counting value of the counter which has been configured for the VLAN ID of the default VLAN.

In response to deletion of one layer-3 Ethernet interface, the counting value 1 is subtracted from the counting value of a counter which has been configured for the VLAN ID of the default VLAN virtual. Further, the VLAN virtual interface of the layer-3 Ethernet interface is deleted if it is determined that the new counting value of the counter configured for the VLAN ID of the default VLAN virtual is zero.

The interface MAC addresses of different layer-3 Ethernet interfaces may be different or the same. If the interface MAC addresses being assigned to multiple layer-3 Ethernet interfaces are the same, only one entry (interface MAC address, VLAN ID) needs to be set in the layer-2 forwarding table.

Due to multiple layer-3 Ethernet interfaces may have the same VLAN virtual interface and the same interface MAC address, the following processing is provided to avoid repeatedly setting and deleting the layer-3 Ethernet interface entry (interface MAC address, VLAN ID).

One counter having counting value 1 is configured for both the VLAN ID of the default VLAN and the interface MAC address of the layer-3 Ethernet interface. In response to another layer-3 Ethernet interface is assigned with the same interface MAC address, the counting value 1 is added to the counting value of the counter configured for both the VLAN ID of the default VLAN and the interface MAC address of the layer-3 Ethernet interface.

In response to deletion of one layer-3 Ethernet sub-interface, the counting value 1 is subtracted from the counting value of the counter configured for both the VLAN ID of the default VLAN virtual and the interface MAC address of the Layer-3 Ethernet interface. Further, the Layer-3 Ethernet interface entry is deleted if it is determined that the new counting value of this counter is zero.

Block 103, a VLAN virtual interface is provided for a layer-3 Ethernet sub-interface on the apparatus based on a binding VLAN of each layer-3 Ethernet sub-interface, an interface MAC address is assigned to each layer-3 Ethernet sub-interface, and an entry (interface MAC address, VLAN ID) of each layer-3 Ethernet sub-interface is set in the layer-2 forwarding table and indicated as a layer-3 attribute. Hereinafter, an entry of each layer-3 Ethernet sub-interface is called a layer-3 Ethernet sub-interface entry. The VLAN ID in the layer-3 sub-interface entry is the VLAN ID of the VLAN virtual interface of the layer-3 Ethernet sub-interface, and the interface MAC address in the layer-3 sub-interface entry is the MAC address assigned to the layer-3 Ethernet sub-interface.

For a layer-3 Ethernet sub-interface, the VLAN ID of the VLAN virtual interface is the VLAN ID of the binding VLAN.

It should be noted that, if the binding VLAN of the layer-3 Ethernet sub-interface is identical to a VLAN of a common VLAN layer-3 interface, the layer-3 Ethernet sub-interface and the common layer-3 interface may have the same VLAN virtual interface. In response to that, the interface MAC address assigned to the layer-3 Ethernet sub-interface must be different from the interface MAC address of the common VLAN layer-3 interface.

Packets received from the layer-3 Ethernet sub-interface have VLAN IDs. By configuring the physical port of the layer-3 Ethernet interface to which the layer-3 Ethernet sub-interface belongs as a VLAN trunk port and the binding VLAN of the layer-3 Ethernet sub-interface is permitted to the physical interface, then the packets that carry the VLAN IDs of binding VLANs received by the physical ports are all mapped to the corresponding layer-3 Ethernet sub-interface. The layer-3 forwarding function of the layer-3 Ethernet sub-interface is implemented by providing the VLAN virtual interface corresponding to the layer-3 Ethernet sub-interface.

Due to the common layer-3 Ethernet interfaces and the layer-3 Ethernet sub-interface may have the same VLAN virtual interface, the following processing is provided to avoid repeatedly setting and deleting the VLAN virtual interface.

In response to the binding VLAN is identical to a VLAN of a common Layer-3 interface, one counter having a counting value 1 is configured for the VLAN ID of the binding VLAN. Further, counting value 1 is subtracted from the counting value of the counter configured for the VLAN ID of the binding VLAN in response to deletion of the layer-3 Ethernet sub-interface and the VLAN virtual interface of the layer-3 Ethernet sub-interface is deleted if it's determined that the new counting value of the counter configured for the VLAN ID of the binding VLAN is zero.

In practical applications, the initial value and increment of the counter may be configured as required, in the above examples, the initial value and the increment are all configured as 1, which is only a simple example and is not used to limit the present disclosure.

When the destination MAC address and VLAN tag of the packet received by the apparatus are matched with an entry indicated with a layer-3 attribute in the layer-2 forwarding table, the layer-3 forwarding is performed for the packet. Even the layer-3 Ethernet sub-interface and the common VLAN layer-3 interface share the same VLAN virtual interface, the interface MAC address assigned to the layer-3 Ethernet sub-interface is different from the interface MAC address of the common VLAN layer-3 interface, so that entry of the layer-3 Ethernet sub-interface is different from entry of the common VLAN layer-3 interface.

In order to avoid instances in which too many layer-3 interface MAC addresses are configured, one interface MAC address is assigned to each layer-3 Ethernet interface and is used as the interface MAC address of the layer-3 Ethernet interface and the layer-3 Ethernet sub-interfaces relating to the layer-3 Ethernet interface, or one shared interface MAC address is assigned to all of the layer-3 Ethernet sub-interfaces on the apparatus, as long as the interface MAC address of the layer-3 Ethernet sub-interfaces is different from the interface MAC address of the common VLAN layer-3 interface within the same VLAN.

Block 104, the apparatus receives a packet from one interface, and determines whether the packet carries a VLAN tag. If the packet carries a VLAN tag, block 106 is performed; otherwise, block 105 is performed.

In the aforesaid block 104, the interface may be a layer-2 port or layer-3 interface, i.e. the layer-3 Ethernet interface or layer-3 Ethernet sub-interface.

Block 105, the apparatus inserts the default VLAN tag into the packet.

For example, if the interface is the layer-3 Ethernet interface performing layer-3 forwarding, the VLAN ID of default VLAN of the interface, i.e., the VLAN 4095 or the VLAN 0, is inserted into the received packet.

Block 106, the apparatus matches a destination MAC address and VLAN ID of the packet with entries in the layer-2 forwarding table, if one entry indicated as the layer-3 attribute is matched, block 107 is performed; otherwise, block 108 is performed.

Block 107, the apparatus performs layer-3 forwarding processing for the packet.

Block 108, the apparatus performs layer-2 forwarding processing for the packet.

The layer-2 forwarding processing performed for the packet complies the configuration in block 101, such as if the inlet of the packet is the physical port corresponding to the layer-3 Ethernet interface, the packet is forbidden from being forwarded to all of the external ports of all of the chips of the apparatus.

Figure 2:
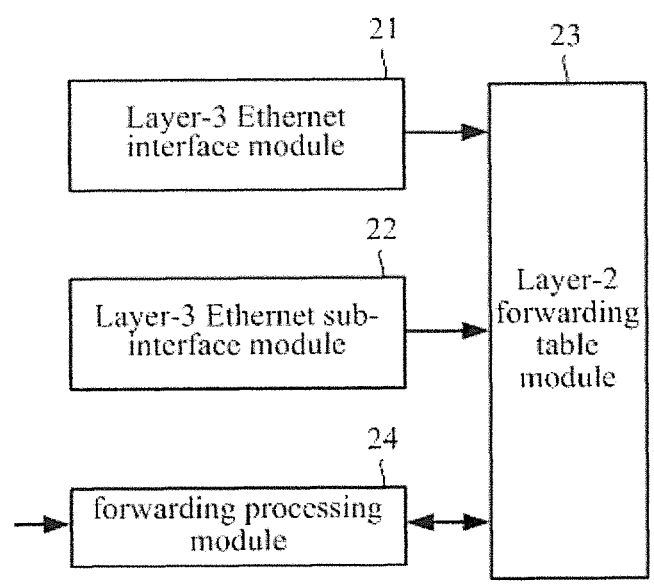
FIG. 2 is a schematic diagram illustrating a structure of an apparatus for providing a layer-3 interface, according to an example of the present disclosure.

FIG. 2 is a schematic diagram illustrating a structure of a device for providing a layer-3 interface in accordance with an example.

In this example, the device for providing the layer-3 interface may be located on a switch apparatus.

As shown in FIG. 2, the device for providing the layer-3 interface includes: a layer-3 Ethernet interface module 21, a layer-3 Ethernet sub-interface module 22, a layer-2 forwarding table module 23 and a forwarding processing module 24.

The layer-3 Ethernet interface module 21 is to provide a VLAN virtual interface of a default VLAN as a VLAN virtual interface for a layer-3 Ethernet interface on the apparatus, assign an interface MAC address for a layer-3 Ethernet interface, set an entry of the layer-3 Ethernet interface in the layer-2 forwarding table stored by the layer-2 forwarding table module 23, and indicate the layer-3 Ethernet interface entry as a layer-3 attribute.

The layer-3 Ethernet sub-interface module 22 is to provide a VLAN virtual interface for a layer-3 Ethernet sub-interface on the apparatus based on the binding VLAN of the layer-3 Ethernet sub-interface, assign an interface MAC address to the layer-3 Ethernet sub-interface, set an entry of the layer-3 Ethernet sub-interface in the layer-2 forwarding table stored by the layer-2 forwarding table module 23, and indicate the layer-3 Ethernet interface entry with a layer-3 attribute.

The layer-2 forwarding table module 23 is to store the layer-2 forwarding table, which at least includes the layer-3 Ethernet interface entries set by the layer-3 Ethernet interface module 21 and the layer-3 Ethernet sub-interface entries set by the layer-3 Ethernet sub-interface module 22.

The forwarding processing module 24 is to receive a packet from one interface of the apparatus, match entries in the layer-2 forwarding table module 23 according to a destination MAC address and a VLAN ID of the packet, and perform layer-3 forwarding for the packet in response to the layer-3 Ethernet interface entry or the layer-3 Ethernet sub-interface entry is matched, or to perform layer-2 forwarding for the packet.

The forwarding processing module 24 is further to insert the VLAN ID of the default VLAN into the packet in response to the packet not carrying a VLAN ID.

Due to the layer-3 Ethernet interface establishing module 21 provides the VLAN virtual interface of the default VLAN as the VLAN virtual interface of the layer-3 Ethernet interfaces on the apparatus, the default VLAN is thus a reserved VLAN and cannot be used for binding with the layer-3 sub-interface. The default VLAN is VLAN 0 or VLAN 4095.

The layer-3 Ethernet interface module 21 is further to configure a counter having a counting value 1 for the VLAN ID of the default VLAN, and add a counting value 1 to the counting value of the counter configured for the VLAN ID of the default VLAN in response to the VLAN virtual interface of the default VLAN is being provided as a VLAN virtual interface of another layer-3 Ethernet interfaces.

The layer-3 Ethernet interface module 21 is further to subtract the counting value 1 from the counting value of the counter configured for the VLAN ID of the default VLAN in response to a deletion of one layer-3 Ethernet interface, to determine whether the new counting value of the counter configured for the VLAN ID of the default VLAN is zero, to delete VLAN virtual interface of the layer-3 Ethernet interface in response to a determination that the new counting value of this counter is zero.

The interface MAC address assigning to the layer-3 Ethernet interfaces may be different or the same. The layer-3 Ethernet interface module 21 is further to configure a counter with counting value 1 for both VLAN ID of the default VLAN and the interface MAC address of the layer-3 Ethernet interfaces, and add the counting value 1 to the counting value of the counter in response to the same interface MAC address is being assigned to the another layer-3 Ethernet interface.

The layer-3 Ethernet interface module 21 is further to subtract the counting value 1 from the counting value of the counter configured for both VLAN ID of the default VLAN and the interface MAC address of the layer-3 Ethernet interfaces in response to a deletion of one layer-3 Ethernet interface, to determine whether the new counting value of the counter configured for both VLAN ID of the default VLAN and the interface MAC address of the layer-3 Ethernet interfaces is zero, to delete the entry of the layer-3 Ethernet interfaces in response to a determination that the new counting value of this counter is zero.

The layer-3 Ethernet sub-interface module 22 is further to configure a counter with counting value 1 for the VLAN ID of the binding VLAN in response to the binding VLAN is identical to a VLAN of a common Layer-3 interface.

The layer-3 Ethernet sub-interface module 22 is further to assign an interface MAC address, different from the interface MAC address of the common layer-3 VLAN interface, to the layer-3 Ethernet sub-interface in response to the binding VLAN is identical to the VLAN of the common VLAN layer-3 interface.

The layer-3 Ethernet sub-interface module 22 is further to assign the same interface MAC address for all the layer-3 Ethernet sub-interfaces provided on the apparatus, or to assign the same interface MAC address for all the layer-3 Ethernet sub-interfaces of one layer-3 Ethernet interface.

The layer-3 Ethernet interface module 22 is further to subtract the counting value 1 from the counting value of the counter configured for the VLAN ID of the binding VLAN in response to a deletion of a layer-3 Ethernet sub-interface, to determine whether the new counting value of the counter configured for the VLAN ID of the binding VLAN is zero, to delete VLAN virtual interface of the layer-3 Ethernet sub-interface in response to a determination that the new counting value of this counter is zero.

The layer-3 Ethernet interface module 21 is further to configure a chip on which a layer-3 Ethernet interface is located as follows: layer-2 packets received from a physical port corresponding to the layer-3 Ethernet interface are forbidden from being transmitted to all external ports of the chip and layer-2 packets received from any other ports are forbidden from being transmitted to the physical port corresponding to the layer-3 Ethernet interface; and to configure a chip that is not the chip on which the provided layer-3 Ethernet interface is located as follows: layer-2 packets received the physical port corresponding to the provided layer-3 Ethernet interface are forbidden from being transmitted from all external ports of the chip.

The layer-3 Ethernet interface module 21 is further to configure all the chips on which all the layer-3 Ethernet interfaces are located as follows: layer-2 protocol packets sent by a CPU are allowed to be sent at its external ports.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A method for providing a layer-3 interface on an apparatus, comprising:
   providing a Virtual Local Area Network (VLAN) virtual interface of a default VLAN as a VLAN virtual interface of a layer-3 Ethernet interface on an apparatus;
   assigning an interface media access control (MAC) address for the layer-3 Ethernet interface;
   setting a layer-3 interface entry including at least the interface MAC address of the layer-3 Ethernet interface and a VLAN identifier (ID) of the default VLAN, and indicating the layer-3 Ethernet entry as a layer-3 attribute;
   providing a VLAN virtual interface of a layer-3 Ethernet sub-interface provided on the apparatus based on a binding VLAN of the layer-3 Ethernet sub-interface;
   assigning an interface MAC address to the layer-3 Ethernet sub-interface;
   setting a layer-3 sub-interface entry including at least the interface MAC address of the layer-3 Ethernet sub-interface and a VLAN ID of the binding VLAN, and indicating the layer-3 sub-interface entry as the layer-3 attribute; and
   receiving a packet from one interface of the apparatus, matching a destination MAC address and a VLAN ID of the packet, and performing layer-3 forwarding for the packet if the layer-3 interface entry or the layer-3 interface entry matching with the destination MAC address and the VLAN ID of the packet.

2. The method of claim 1, the method further comprising:
   in response to the packet not carrying a VLAN tag, inserting a VLAN ID of the default VLAN to the packet.

3. The method of claim 1, wherein the default VLAN is VLAN 0 or VLAN 4095.

4. The method of claim 1, the method further comprising:
configuring a first counter with counting value 1 for the VLAN ID of the default VLAN;
in response to providing the VLAN virtual interface of the default VLAN as a VLAN virtual interface of another layer-3 Ethernet interface, adding the counting value 1 to the counting value of the first counter.

5. The method of claim 1, the method further comprising:
in response to the binding VLAN being identical to a VLAN of a common Layer-3 interface, configuring a second counter with counting value 1 for the VLAN ID of the binding VLAN.

6. The method of claim 1, wherein assigning the interface MAC address to the layer-3 Ethernet sub-interface further comprises:
in response to the binding VLAN being identical to the VLAN of the common layer-3 interface, assigning an interface MAC address that is different from an interface MAC address of the common VLAN layer-3 interface.

7. The method of claim 5, the method further comprising:
in response to deletion of one layer-3 Ethernet interface, subtracting counting value 1 from the counting value of the first counter;
determining whether a new counting value of the first counter is zero;
in response to a determination that the new counting value of the first counter is zero, deleting the VLAN virtual interface of the layer-3 Ethernet interface.

8. The method of claim 6, the method further comprising:
in response to deletion of one layer-3 Ethernet sub-interface, subtracting counting value 1 from the counting value of the second counter;
determining whether a new counting value of the second counter is zero;
in response to a determination that the new counting value of the second counter is zero, deleting the VLAN virtual interface of the layer-3 Ethernet sub-interface.

9. The method of claim 1, before providing the VLAN virtual interface as the default VLAN for each layer-3 Ethernet interface on the apparatus, the method further comprising:
configuring a chip on which each layer-3 Ethernet interface is located as follows: a layer-2 packet received from a physical port corresponding to the layer-3 Ethernet interface is forbidden from being transmitted to all of external ports of the chip and a layer-2 packet coming from any other port is forbidden from being transmitted to the physical port corresponding to the layer-3 Ethernet interface; and
configuring a chip that is not the chip on which the layer-3 Ethernet interface is located as follows: a layer-2 packet coming from a physical port corresponding to the layer-3 Ethernet interface is forbidden from being transmitted to all of the external ports of the chip.

10. The method of claim 9, wherein providing the layer-3 Ethernet interface on the apparatus comprises:
configuring a chip on which each layer-3 Ethernet interface is located such that a layer-2 protocol packet sent by a Central Processing Unit (CPU) is allowed to be sent to external ports of the chip.

11. An apparatus for providing a layer-3 interface, comprising:
a layer-3 Ethernet interface module that provides a Virtual Local Area Network (VLAN) virtual interface of a default VLAN as a VLAN virtual interface for a layer-3 Ethernet interface provided on the apparatus, assigns an interface MAC address for a layer-3 Ethernet interface, sets an entry of the layer-3 Ethernet interface in a layer-2 forwarding table, and indicates the layer-3 Ethernet interface entry as a layer-3 attribute;
a layer-3 Ethernet sub-interface module that provides a VLAN virtual interface for a layer-3 Ethernet sub-interface on the apparatus based on a binding VLAN of the layer-3 Ethernet sub-interface, assigns an interface MAC address to the layer-3 Ethernet sub-interface, sets an entry of the layer-3 Ethernet sub-interface in a layer-2 forwarding table, and indicates the layer-3 Ethernet sub-interface entry as the layer-3 attribute;
wherein a layer-2 forwarding table module stores the layer-2 forwarding table, which at least includes layer-3 Ethernet interface entries set by the layer-3 Ethernet interface module and layer-3 Ethernet sub-interface entries set by the layer-3 Ethernet sub-interface module;
a forwarding processing module that receives a packet from one interface of the apparatus, matches entries in the layer-2 forwarding table according to a destination MAC address and a VLAN ID of the packet, and performs layer-3 forwarding for the packet in response to the layer-3 Ethernet interface entry or the layer-3 Ethernet sub-interface entry being matched, or performs layer-2 forwarding for the packet.

12. The apparatus of claim 11, wherein the forwarding processing module further inserts a VLAN ID of the default VLAN into the packet in response to the packet not carrying a VLAN ID.

13. The apparatus of claim 11, wherein the default VLAN is VLAN 0 or VLAN 4095.

14. The apparatus of claim 11, wherein the layer-3 Ethernet interface module further configures a first counter having a counting value 1 for the VLAN ID of the default VLAN, adds a counting value 1 to the counting value of the first counter configured for the VLAN ID of the default VLAN in response to the VLAN virtual interface of the default VLAN is being provided as a VLAN virtual interface of other layer-3 Ethernet interfaces.

15. The apparatus of claim 11, wherein the layer-3 Ethernet sub-interface module further configures a second counter with counting value 1 for the VLAN ID of the binding VLAN in response to the binding VLAN being identical to a VLAN of a common Layer-3 interface.

16. The apparatus of claim 11, wherein the layer-3 Ethernet sub-interface module further assigns an interface MAC address that is different from an interface MAC address of a common VLAN layer-3 interface in response to the binding VLAN being identical to the VLAN of the common layer-3 interface.

17. The apparatus of claim 14, wherein the layer-3 Ethernet interface module further subtracts the counting value 1 from the counting value of the first counter in response to a deletion of one layer-3 Ethernet interface, determines whether a new counting value of the first counter is zero, and deletes the VLAN virtual interface of the layer-3 Ethernet interface in response to a determination that the new counting value of the first counter is zero.

18. The apparatus of claim 15, wherein the layer-3 Ethernet interface module further subtracts the counting value 1 from the counting value of the second counter response to a deletion of a layer-3 Ethernet sub-interface, determines whether a new counting value of the second counter is zero, and deletes the VLAN virtual interface of the layer-3 Ethernet sub-interface in response to a determination that the new counting value of the second counter is zero.

19. The apparatus of claim 11, wherein
the layer-3 Ethernet interface module further configures a chip on which a layer-3 Ethernet interface is located as follows: layer-2 packets received from a physical port corresponding to the layer-3 Ethernet interface are forbidden from being transmitted to all external ports of the chip and layer-2 packets received from any other ports are forbidden from being transmitted to the physical port corresponding to the layer-3 Ethernet interface; and
configures a chip that is not the chip on which the provided layer-3 Ethernet interface is located as follows: layer-2 packets received the physical port corresponding to the provided layer-3 Ethernet interface are forbidden from being transmitted at all external ports of the chip.

20. The apparatus of claim 19, wherein
the layer-3 Ethernet interface module further configures all the chips on which all the layer-3 Ethernet interfaces are located as follows: layer-2 protocol packets sent by a Central Processing Unit (CPU) are allowed to be sent at its external ports.

* * * * *